United States Patent [19]

Jenkins et al.

[11] 4,035,088

[45] July 12, 1977

[54] HIGH ENERGY LASER BEAM SAMPLING METER

[75] Inventors: Andrew H. Jenkins; John J. Wachs, both of Huntsville, Ala.

[73] Assignee: The United States of America as represented by the Secretary of the Army, Washington, D.C.

[21] Appl. No.: 602,169

[22] Filed: Aug. 5, 1975

[51] Int. Cl.² .......................................... G01J 1/42
[52] U.S. Cl. ................................................ 356/218
[58] Field of Search .............. 356/218, 88, 73, 186, 356/225; 331/94.5 S

[56] References Cited

U.S. PATENT DOCUMENTS

| | | | |
|---|---|---|---|
| 3,344,703 | 10/1967 | Milton | 356/218 |
| 3,732,491 | 5/1973 | Battista | 356/215 |
| 3,813,172 | 5/1974 | Walker | 356/225 |

OTHER PUBLICATIONS

Walker, Richard A., "Optical Systems for Defining the Viewing and Measuring..." Applied Optics, vol. 11, No. 9, Sept. 1972, pp. 2060–2068.

Primary Examiner—John K. Corbin
Assistant Examiner—Rolf Hille
Attorney, Agent, or Firm—Nathan Edelberg; Robert P. Gibson; Harold W. Hilton

[57] ABSTRACT

Apparatus for accurately sampling and measuring the beam power of a high energy laser beam without blocking or unduly perturbing the beam for phenomenological effects purposes. The beam is accurately and reliably sampled at an acceptable frequency and low amplitude without effecting the beam characteristics for further experimental use.

5 Claims, 2 Drawing Figures

HIGH ENERGY LASER BEAM SAMPLING METER

DEDICATORY CLAUSE

The invention described herein may be manufactured, used, and licensed by or for the Government for governmental purposes without the payment to us of any royalties thereon.

BACKGROUND OF THE INVENTION

The invention of the laser and the subsequent development of the high energy/power laser (P > 200 kw) focused attention on the potential of the high energy/power laser in the U.S. Army roles and missions in defense of the United States. In order to evaluate this potential it is necessary to conduct experiments on the characteristic effects of propagation, materials damage and target vulnerability as a function of energy density and total laser beam power.

However, the highly intense laser beam oversaturated and destroyed known energy detectors and power meters with the exception of large heat sink spherical calorimeter which totally blocked the beam. When the beam energy was spread over a larger area the ratio of the area of the beam to the detector area was so large that accurate and reliable power measurements could not be made due to inhomogeneties in the beam. The power could be measured only by intercepting the total beam in a large calorimeter or the phenomenological effects produced without the measurement of energy/power. Therefore, the relationship between power and effects could not be accurately established since measurements of both factors could not be made simultaneously.

This condition required a device which would accurately sample and measure the beam power without blocking or unduly perturbing the beam for phenomenological effects purposes. The device of the present invention accurately and reliably samples the beam energy at an acceptable frequency and low amplitude without effecting the beam characteristics for further experimental use. This feature is unique in high energy laser power meters. All known energy measuring devices are for very low level energy or block a high energy beam completely.

SUMMARY OF THE INVENTION

A beam sampling wheel is secured to a fractional horsepower constant speed electric motor for rotation thereby. The wheel is placed at an angle with and out of the main beam. The wheel includes a rim having a plurality of spaced ribs secured and extending inwardly for secured relation with a hub which secures to the motor shaft. A portion of the beam is reflected from the ribs to a collecting mirror and focused into a low energy detector.

DESCRIPTION OF THE PREFERRED EMBODIMENT

Figure 1:
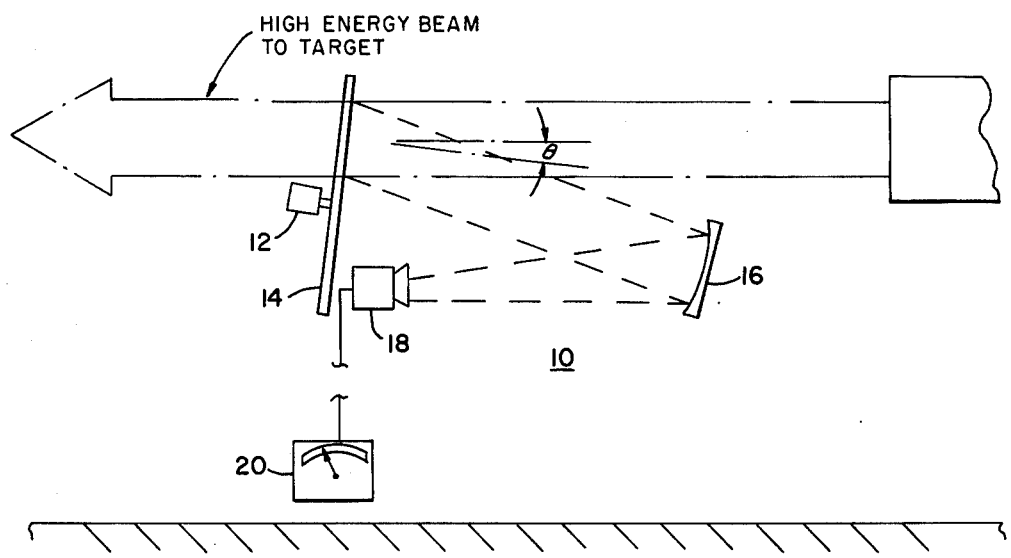
FIG. 1 is a diagrammatic view of the beam sampling apparatus of the present invention.

As shown in FIG. 1 the high energy laser beam sampling apparatus 10 of the present invention includes a fractional horsepower constant speed electric motor 12 having a high energy beam sampling wheel 14 secured to the shaft of the motor. A collecting and focusing mirror 16 is mounted out of the beam in angular relation with the sampling wheel to collect and focus the beam reflected from the wheel. A low level detector 18 is disposed to receive the reflected portion of the beam and to send an electrical signal which is calibrated to provide a visual (or recorded) indication of the sampled energy by a power display device 20.

The sampling apparatus is related to the main beam by a calibration constant established by a secondary standard calorimeter. Once the calibration constant has been established and the geometry of the laser beam sampling apparatus is not disturbed, the apparatus remains calibrated and requires only an infrequent confidence check.

Figure 2:
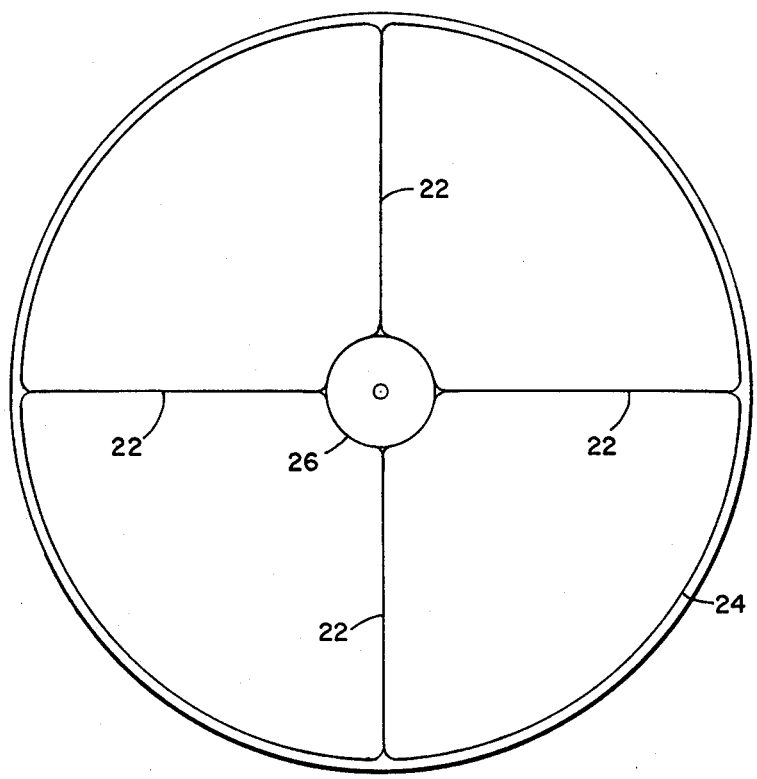
FIG. 2 is an elevational view of the beam sampling wheel of the present invention.

The drive motor 12 is a standard fractional constant speed motor readily available commercially. The beam sampling wheel 14, shown in detail in FIG. 2, includes four polished 0.030 inch thick knife edge blades 82 which reflect fractional energy from the main beam. The blades are fabricated and epoxy glued to a rim 24 and to a hub 26 which is drilled to the motor shaft size and fitted with a locking device. As seen in FIG. 2 the blades are in equally spaced relation with the opening between the blades being relatively large so the major portion of the beam may pass therethrough as illustrated in FIG. 1. The radius of the wheel is designed to the beam diameter allowing for the angular limits the wheel makes with the main beam. The collecting and focusing mirror 16 (FIG. 1) is a front surface mirror available from most optical shops as a standard item. The low level energy detector 18 is a standard detector available from any number of manufacturers. The energy reflected by the sampling wheel 14 cannot exceed the low level energy detector 18 limits in response time and maximum energy. Therefore, the wheel is tailored to the selected low level detector or vice versa. The power display 20 is a standard item which can be remotely located from the rest of the sampling meter in a safe or convenient location. Typically, the power display may be a digital volt meter for immediate visual reference and/or recorded on a standard oscillograph and/or magnetic tape for a permanent record.

The operational sequence is as follows. The motor 12 can be manually or automatically started and the wheel 14 brought up to design speed. The high energy laser beam is coupled out of the cavity for the required time of the test (e.g. 1–15 sec.). During the test time the sampling wheel 14 is sampling the main beam and reflecting a fractional part (0.5%) of the main beam energy from the four highly polished knife edge blades. The sampling rate is (4 blades × 15 rps) 60 samples per second. The samples are collected by the mirror 16 and focused onto the detector 18 which has a response time of less than 1 second. The output of the detector 18 is fed to the display and recording unit 20 where the output of the detector when multiplied by the calibration constant yields the main beam power output of a function of time. The total energy and power output of the beam are known and the beam is undisturbed for further experimental use.

The beam sampling apparatus of the present invention has several advantages. First, the sampling wheel, due to multiblade design, provides a high frequency low amplitude output to the energy detector which provides a reliable D.C. level signal. Second, since each blade is in the high energy main beam only 25% of the time, and due to the small highly polished area exposed to the main beam it does not require a special cooling medium. Third, the sampling meter is simple and easy to calibrate and requires only occasional reassurance calibration checks. Fourth, the sampling meter requires no special parts or components except the unique sample wheel which is easily fabricated. Fifth, the sampling meter is dependable, reliable and economical.

We claim:

1. A high energy laser beam sampling apparatus comprising:
    a. a wheel rotatably mounted in said laser beam, said wheel being in angular relation with the axis of said beam to reflect a portion of said beam therefrom said wheel including four highly reflective ribs having knife edges from which the beam portion is reflected, and a hub having said ribs secured thereto and extending radially therefrom;
    b. means for rotating said wheel at a predetermined spin rate;
    c. collecting and focusing means disposed for receiving and reflecting said portion of said beam therefrom;
    d. sensing means for receiving said portion of said beam from said collecting and focusing means and providing a signal proportional to the intensity of said beam;
    e. indicator means for receiving said signal and for providing a visual indication of the sampled energy.

2. Apparatus as in claim 1 wherein said means for rotating said wheel includes a constant speed electric motor, said wheel being secured to the shaft of said motor.

3. Apparatus as in claim 2 wherein said collecting and focussing means is a front surface reflecting mirror.

4. Apparatus as in claim 3 wherein said sensing means includes a low level energy detector for providing said signal.

5. Apparatus as in claim 4 wherein said indicator means is a power display device for providing a visual indication of the sampled energy.

* * * * *